United States Patent
Fuentes (10) Patent No.: US 12,227,973 B2
(45) Date of Patent: Feb. 18, 2025

(54) HOOD RELEASE LEVER COVER ASSEMBLY FOR A VEHICLE

(71) Applicant: Nissan North America, Inc., Franklin, TN (US)

(72) Inventor: Bobby Fuentes, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 658 days.

(21) Appl. No.: 17/024,174

(22) Filed: Sep. 17, 2020

(65) Prior Publication Data

US 2022/0081943 A1   Mar. 17, 2022

(51) Int. Cl.
| | |
|---|---|
| *E05B 83/24* | (2014.01) |
| *B60R 13/02* | (2006.01) |
| *E05B 13/00* | (2006.01) |
| *E05B 85/10* | (2014.01) |

(52) U.S. Cl.
CPC ........ *E05B 83/243* (2013.01); *B60R 13/0275* (2013.01); *E05B 13/001* (2013.01); *E05B 85/10* (2013.01); *E05Y 2201/11* (2013.01); *E05Y 2201/484* (2013.01); *E05Y 2201/626* (2013.01); *E05Y 2201/682* (2013.01); *E05Y 2600/626* (2013.01); *E05Y 2900/536* (2013.01)

(58) Field of Classification Search
CPC ...... E05B 13/00; E05B 13/001; E05B 1/0061; E05B 1/0084; E05B 1/0092; E05B 1/04; E05B 5/00; E05B 5/006; E05B 7/00; E05B 83/16; E05B 83/24; E05B 83/243; E05B 83/247; E05B 85/10; E05B 85/12; E05B 85/14; E05B 85/16
See application file for complete search history.

(56) References Cited

U.S. PATENT DOCUMENTS

| | | | | |
|---|---|---|---|---|
| 2,237,949 | A | * | 4/1941 | Palmer .................... E05B 85/14 292/DIG. 31 |
| 5,560,659 | A | * | 10/1996 | Dault .................... E05B 13/005 292/336.3 |
| 5,853,060 | A | * | 12/1998 | Chao ....................... E05B 83/16 292/216 |

(Continued)

FOREIGN PATENT DOCUMENTS

| | | | | |
|---|---|---|---|---|
| CN | 106437349 | A | * 2/2017 | ............ E05B 77/38 |
| CN | 108035632 | A | * 5/2018 | |

(Continued)

OTHER PUBLICATIONS

Computer Generated Translation for FR 3014814 A1, Generated on Dec. 23, 2023, https://worldwide.espacenet.com/ (Year: 2023).*

(Continued)

*Primary Examiner* — Alyson M Merlino
(74) *Attorney, Agent, or Firm* — Global IP Counselors, LLP (57) ABSTRACT

A hood release lever cover assembly for a vehicle includes a bracket assembly and a hood release lever. The bracket assembly is configured to be connected to a vehicle body structure of the vehicle. The hood release lever cover is pivotally connected to the bracket assembly. The hood release lever cover is movable between a first position preventing movement of a hood release lever of the vehicle and a second position allowing movement of the hood release lever.

17 Claims, 5 Drawing Sheets

(56) References Cited

U.S. PATENT DOCUMENTS

| | | | | |
|---|---|---|---|---|
| 5,904,385 | A * | 5/1999 | Linder | E05B 85/107 |
| | | | | 292/336.3 |
| 6,062,614 | A * | 5/2000 | Petzold | E05B 85/14 |
| | | | | 292/336.3 |
| 7,108,301 | B2 * | 9/2006 | Louvel | E05B 85/103 |
| | | | | 292/336.3 |
| 8,109,545 | B2 * | 2/2012 | Lukas | E05B 85/16 |
| | | | | 292/336.3 |
| 2003/0070456 | A1 * | 4/2003 | Zamberg | E05B 13/001 |
| | | | | 70/208 |
| 2014/0300115 | A1 * | 10/2014 | Vasi | E05B 85/103 |
| | | | | 292/336.3 |
| 2019/0225141 | A1 * | 7/2019 | DeLong | E05B 83/243 |
| 2022/0097775 | A1 * | 3/2022 | Fuentes | E05B 13/001 |
| 2022/0098906 | A1 * | 3/2022 | Fuentes | B60R 13/0275 |

FOREIGN PATENT DOCUMENTS

| | | | | | |
|---|---|---|---|---|---|
| DE | 2243538 | A | * | 3/1974 | E05B 85/14 |
| DE | 19847212 | A1 | * | 4/2000 | E05B 85/14 |
| DE | 10047839 | A1 | | 4/2002 | |
| EP | 2666942 | A2 | * | 11/2013 | E05B 13/001 |
| EP | 2332801 | B1 | * | 11/2016 | E05B 13/001 |
| FR | 3014814 | A1 | * | 6/2015 | E05B 13/001 |
| GB | 576224 | A | * | 3/1946 | |
| GB | 1120527 | A | * | 7/1968 | |
| JP | H05112140 | A | | 5/1993 | |
| KR | 2016107423 | A | * | 9/2016 | E05B 5/00 |
| WO | WO-2017194311 | A1 | * | 11/2017 | E05B 5/006 |
| WO | WO-2019175858 | A1 | * | 9/2019 | E05B 1/0061 |

OTHER PUBLICATIONS

"www.ebay.com/itm/electrical-lockout-round-switch-lock-out-device-push-button-30mm-dia-home-loto-/182221011088", Sep. 17, 2020.

* cited by examiner

HOOD RELEASE LEVER COVER ASSEMBLY FOR A VEHICLE

BACKGROUND

Field of the Invention

The present invention generally relates to a hood release lever cover assembly for a vehicle. More specifically, the present invention relates to a hood release lever cover assembly in which a hood release lever cover substantially prevents accidental movement of a hood release lever.

Background Information

A hood release lever for releasing a hood of a vehicle is disposed in a passenger compartment of a vehicle. The hood release lever is operated to release a hood of the vehicle.

SUMMARY

A need exists for a hood release lever cover assembly in which a hood release lever cover substantially prevents accidental movement of a hood release lever.

In view of the state of the known technology, one aspect of the present disclosure is to provide a hood release lever cover assembly for a vehicle including a bracket assembly and a hood release lever. The bracket assembly is configured to be connected to a vehicle body structure of the vehicle. The hood release lever cover is pivotally connected to the bracket assembly. The hood release lever cover is movable between a first position preventing movement of a hood release lever of the vehicle and a second position allowing movement of the hood release lever.

Another aspect of the present invention is to provide a hood release lever cover assembly for a vehicle including a hood release lever and a hood release lever cover. The hood release lever is pivotally connected to a vehicle body structure. The hood release lever is movable between a first position and a second position. A hood of the vehicle is released when the hood release lever is moved to the second position. A hood release lever cover is pivotally connected to vehicle body structure. The hood release lever cover is movable between a first position preventing movement of a hood release lever of the vehicle and a second position allowing movement of the hood release lever.

Also other objects, features, aspects and advantages of the disclosed hood release lever cover assembly for a vehicle will become apparent to those skilled in the art from the following detailed description, which, taken in conjunction with the annexed drawings, discloses exemplary embodiments of the hood release lever cover assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
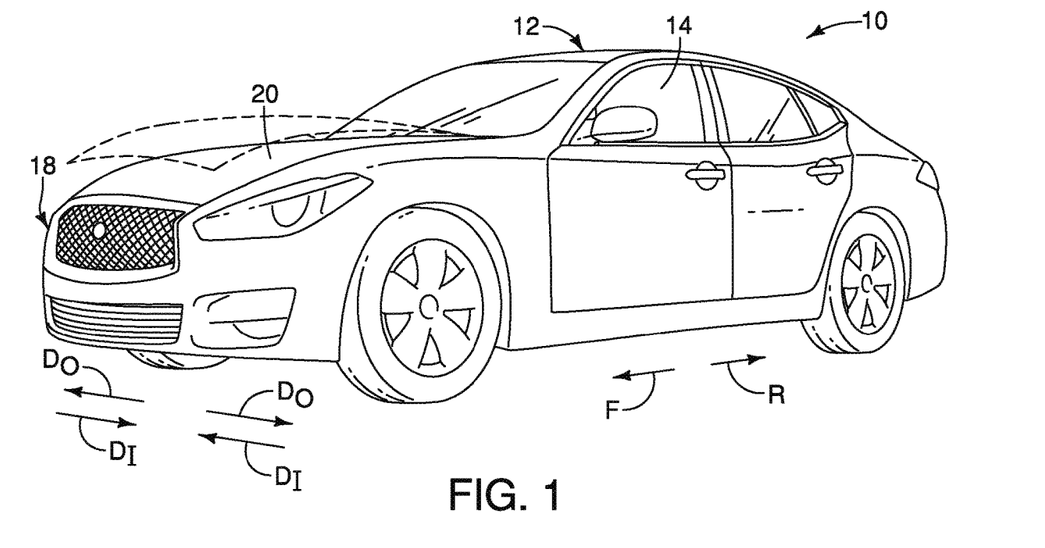
FIG. 1 is a perspective view of a vehicle including a hood release lever cover assembly in accordance with an exemplary embodiment of the present invention.
Figure 2:
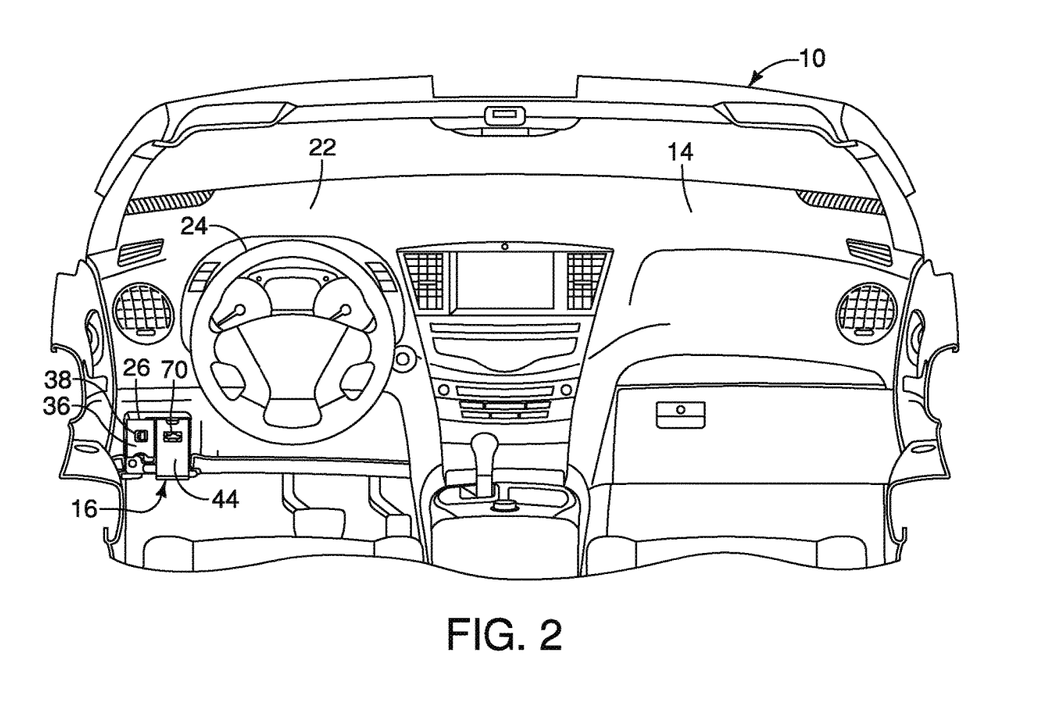
FIG. 2 is an elevational view of a dashboard of the vehicle of FIG. 1 including the hood release lever cover assembly.

Referring initially to FIGS. 1 and 2, a vehicle 10 is illustrated in accordance with an exemplary embodiment of the present invention. The vehicle 10 includes a vehicle body structure 12 that defines a vehicle interior 14 and includes a hood release lever cover assembly 16 disposed in the vehicle interior 14 of the vehicle 10. The vehicle interior 14 can be a passenger compartment within the vehicle 10. The vehicle body structure 12 includes, among other structures, a front-end structure 18 and a hood 20. The hood 20 is movably connected to the front-end structure 18 to be movable between a first, or closed position (shown in solid lines), and a second, or open, position (shown in dashed lines), as shown in FIG. 1.

As shown in FIG. 2, an instrument panel, or vehicle dashboard, 22 is located within the vehicle interior 14. A steering wheel 24 is connected to a steering column (not shown), which passes through the instrument panel 22.

Figure 3:
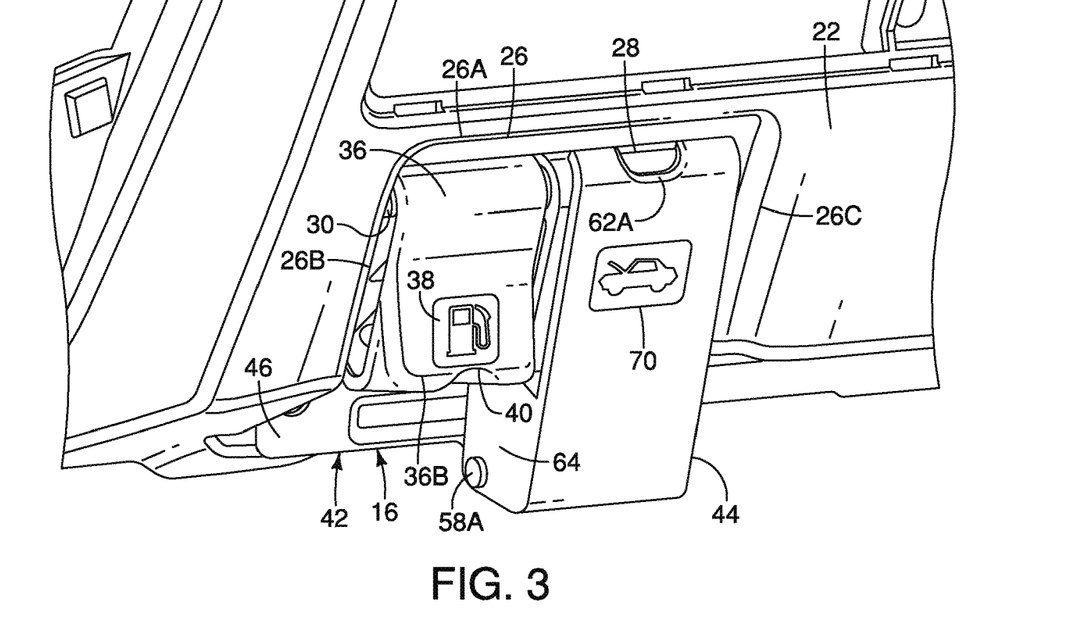
FIG. 3 is a perspective view of the hood release lever cover assembly of FIG. 2 in which the hood release lever cover and the hood release lever are in first positions.
Figure 4:
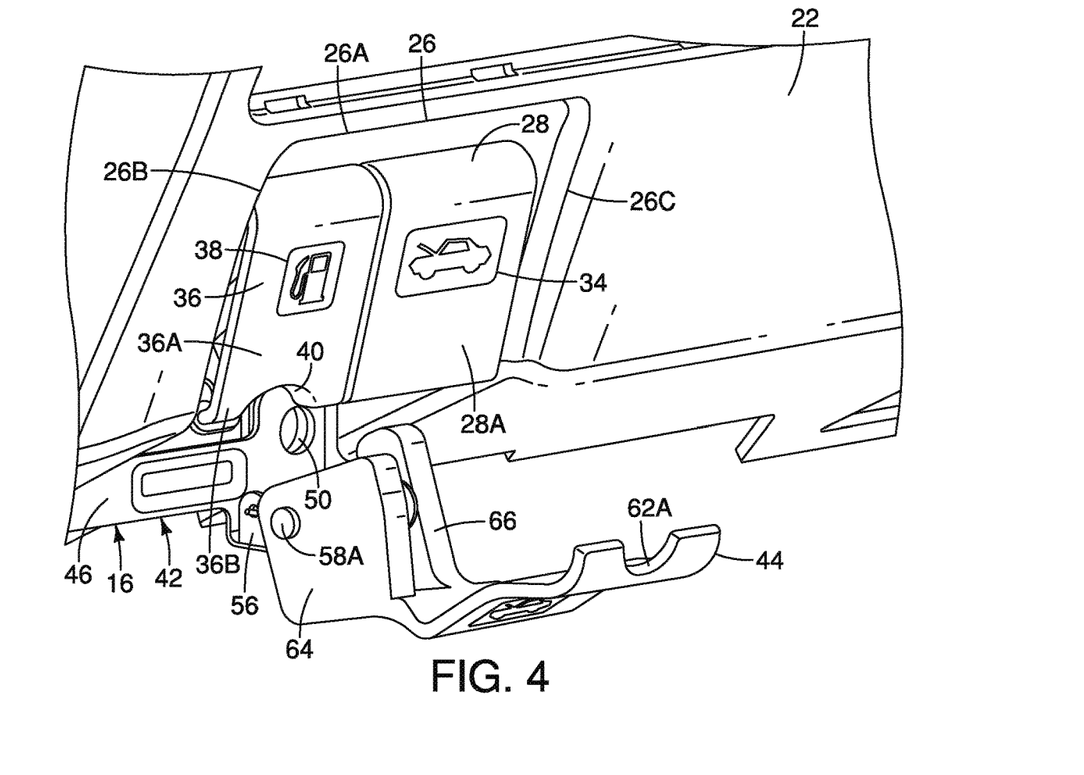
FIG. 4 is a perspective view of the hood release lever cover assembly of FIG. 2 in which the hood release lever cover is in a second position and a hood release lever is in a first position.
Figure 5:
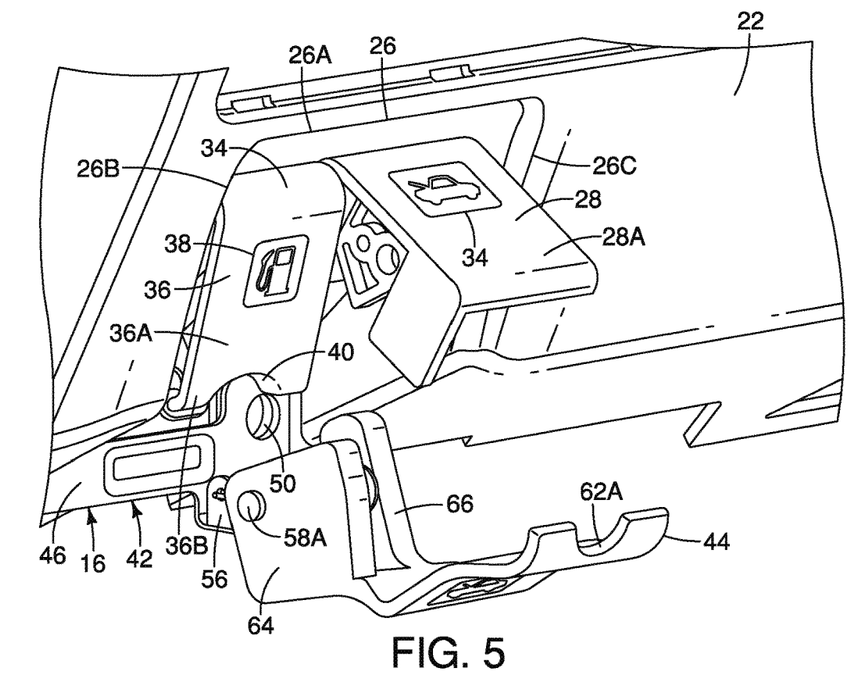
FIG. 5 is a perspective view of the hood release lever cover assembly of FIG. 4 in which the hood release lever cover and the hood release lever are in second positions.
Figure 6:
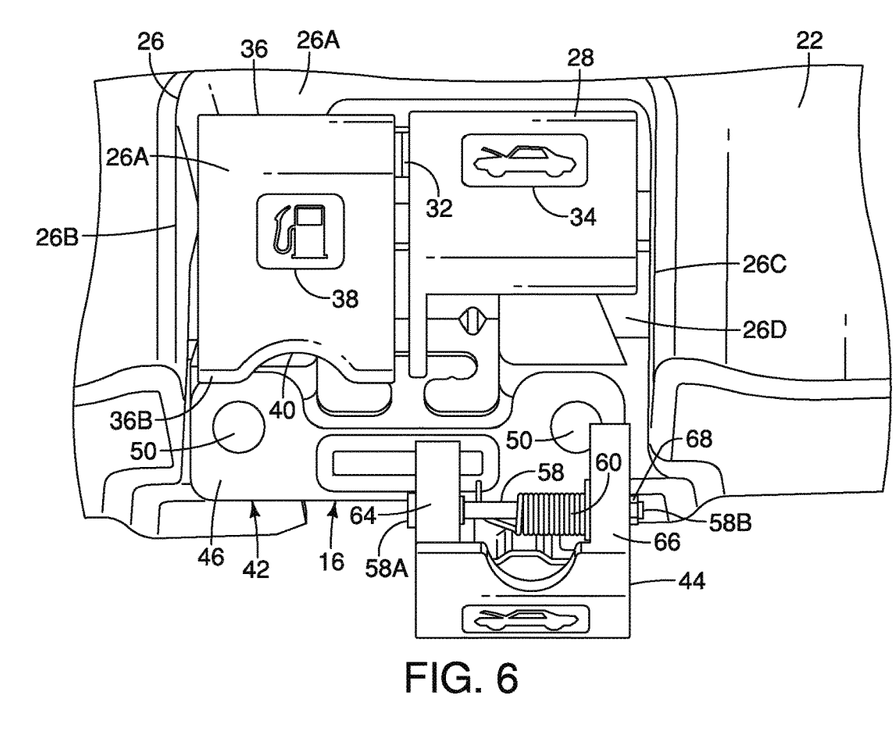
FIG. 6 is an elevational view the hood release lever cover assembly of FIG. 5 in which the hood release lever cover and the hood release lever are in second positions.

The instrument panel 22 includes a recessed portion 26, as shown in FIGS. 2-6, which includes a hood release lever 28. The recessed portion 26 is defined by an upper wall 26A, oppositely disposed side walls 26B and 26C and a rear wall 26D. The hood release lever 28 is pivotally connected to the instrument panel 22 of the vehicle body structure 12. The hood release lever 28 is movable between a first position, as shown in FIG. 4, and a second position, as shown in FIGS. 5 and 6. Moving the hood release lever 28 from the first position to the second position releases the hood 20, as shown in FIG. 1. A pin 30 extends between the side walls 26B and 26C of the recessed portion 26, as shown in FIG. 3. The hood release lever 28 is movably connected to the pin 30 to facilitate moving between the first and second positions. As shown in FIGS. 4 and 5, the hood release lever 28 is moved in a counter-clockwise direction from the first position to the second position, and a clockwise direction when moving the hood release lever 28 from the second position to the first position. A biasing member 32, such as a torsion spring, is disposed on the pin 30 to bias the hood release lever 28 to the first position. The biasing member 32 facilitates returning the hood release lever 28 to the first position (FIG. 4) from the second position (FIG. 5). Alternatively, the hood release lever 28 can be movably connected to the vehicle body structure 12 within the recessed portion 26 in any suitable manner to facilitate moving the hood release lever 28 between the first and second positions. An icon 34 indicating a vehicle with a released hood is disposed on a front surface 28A of the hood release lever 28.

A fuel tank door release lever 36 is movably disposed in the recessed portion 26 of the instrument panel 22, as shown in FIGS. 2-6. The fuel tank door release lever 36 is disposed adjacent the hood release lever 28. The fuel tank door release lever 36 is preferably disposed in a vehicle outboard direction DO (FIG. 1) of the hood release lever 28. The fuel tank door release lever 36 is disposed on the pin 30 (FIG. 3) to facilitate moving the fuel tank door release lever 36 between the first and second position. A biasing member, such as a torsion spring, can be disposed on the pin 30 to bias the fuel tank door release lever 36 to the first position. The fuel tank door release lever 36 is moved in a counter-clockwise direction from the first position to a second position to release the fuel tank door (not shown). The fuel tank door release lever 36 is moved in the clockwise direction from the second position to the first position. The fuel tank door release lever 36 is laterally spaced from the hood release lever 28, as shown in FIGS. 2-6 such that one of the hood release lever 28 and the fuel tank door release lever 36 can be operated without interfering with the other of the hood release lever 28 and the fuel tank door release lever 36. An icon 38 indicating a fuel pump is disposed on a front surface 36A of the fuel tank door release lever 36. A recess 40 can be disposed in a lower edge 36B of the fuel tank door release lever 36 to facilitate moving the fuel tank door release lever 36 between the first and second positions.

The hood release lever cover assembly 16 includes a bracket assembly 42 and a hood release lever cover 44, as shown in FIGS. 2-7. The bracket assembly 42 is configured to be connected to the recessed portion 26 of the vehicle body structure 12 of the vehicle 10. The hood release lever cover 44 is pivotally connected to the bracket assembly 42. The hood release lever cover 44 is movable between a first position, as shown in FIG. 3, preventing movement of the hood release lever 28 of the vehicle 10 and a second position, as shown in FIGS. 4-6, allowing movement of the hood release lever 28.

Figure 7:
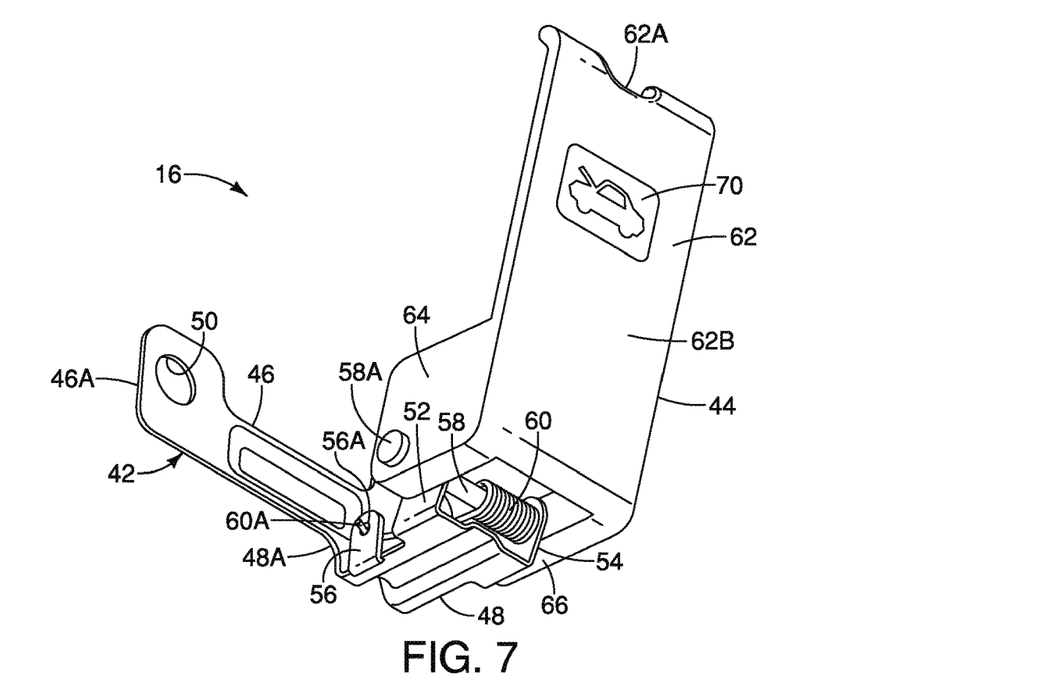
FIG. 7 is a perspective view of the hood release lever cover assembly of FIG. 2.
Figure 8:
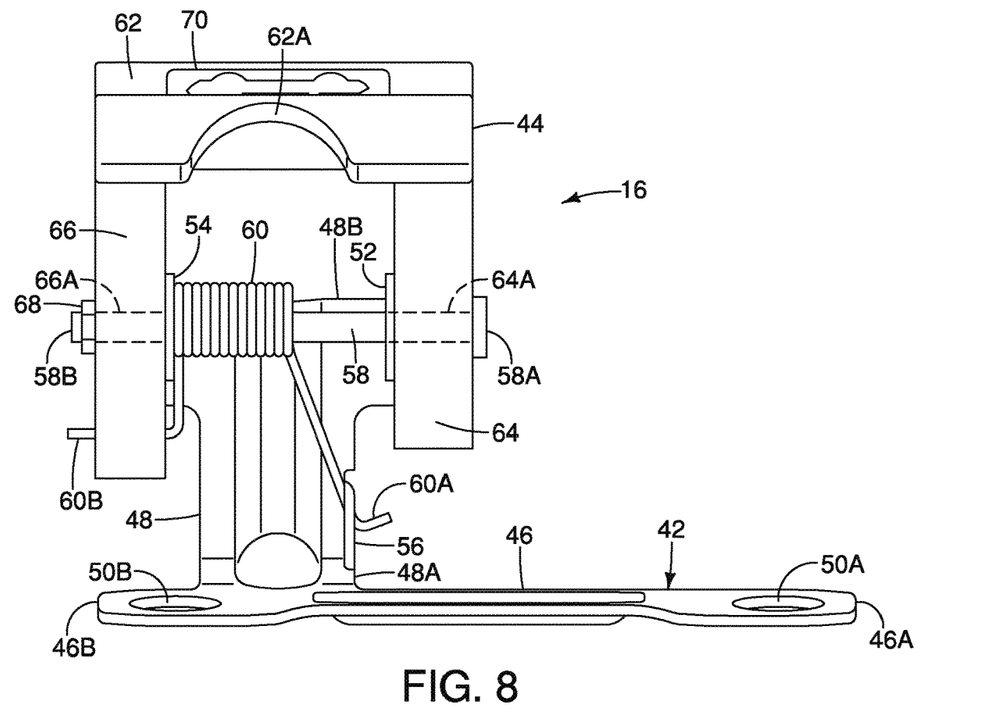
FIG. 8 is a top plan view of the hood release lever cover assembly of FIG. 7.

A bracket of the bracket assembly 42 includes a mounting body 46 and a mounting arm 48 extending outwardly from the mounting body 46, as shown in FIGS. 7 and 8. The mounting body 46 is substantially planar and has at least one fastener opening 50 configured to receive a fastener to secure the bracket assembly 42 to the rear wall 26D of the recessed portion 26 of the vehicle body structure 12 (FIG. 1). As shown in FIGS. 6 and 8, the mounting body 46 has two fastener openings 50A and 50B, although any suitable number of fastener openings can be used. One of the fastener openings 50A is disposed proximate a first end 46A of the mounting body 46, and the other fastener opening 50B is disposed proximate a second end 46B of the mounting body 46, as shown in FIG. 8. The bracket of the bracket assembly 42 is preferably made of a metallic material, although any suitable material can be used.

The mounting arm 48 extends outwardly from the mounting body 46, as shown in FIGS. 7 and 8. The mounting arm 48 has a first end 48A connected to the mounting body 46. A first mounting tab 52 and a second mounting tab 54 extend outwardly from a second end 48B of the mounting arm 48. The first and second mounting tabs 52 and 54 extend outwardly from opposite sides of the mounting arm 48. A third mounting tab 56 extends outwardly proximate the first end 48A of the mounting arm 48. The first mounting tab 52 and the third mounting tab 56 are disposed on the same side of the mounting tab 48.

A pin 58 is rigidly connected to the mounting arm 48 of the bracket of the bracket assembly 42, as shown in FIGS. 7 and 8. The pin 58 is received by openings in the first and second mounting tabs 52 and 54 of the mounting arm 48. The pin 58 has a first end 58A and a second end 58B.

A spring member 60 is disposed on the pin 58, as shown in FIGS. 7 and 8. The spring member 60 is preferably a torsion spring, although any suitable spring member can be used. A first end 60A of the spring member 60 is connected to the bracket assembly 42. The first end 60A of the spring member 60 is preferably received by an opening 56A in the third tab 56 of the mounting arm 48 of the bracket assembly 42, although the first end 60A of the spring member can be connected to the bracket of the bracket assembly 42 in any suitable manner. A second end 60B of the spring member 60 is connected to the hood release lever cover 44.

The hood release lever cover 44 includes a main body portion 62, a first arm 64 and a second arm 66, as shown in FIGS. 7 and 8. The first arm 64 extends outwardly from the main body portion 62 of the hood release lever cover 44. The second arm 66 extends outwardly from the main body portion 62 of the hood release lever cover 44. Each of the first and second arms 64 and 66 includes an opening 64A and 66A, respectively, configured to receive the pin 58. The first and second arms 64 and 66 are pivotally connected to the pin 58, thereby pivotally connecting the hood release lever cover 44 to the pin 58. The main body portion 62 includes a cutout portion 62A configured to facilitate moving the hood release cover member 44 between the first and second positions. An icon 70 indicating a vehicle with a released hood is disposed on a front surface 62B of the main body portion 62 of the hood release lever cover 44. The icon 70 faces in a rearward vehicle direction R (FIG. 1) to be visible to an occupant in the passenger compartment 14. The hood release lever cover 44 is preferably made of a plastic material, although any suitable material can be used.

Figure 9:
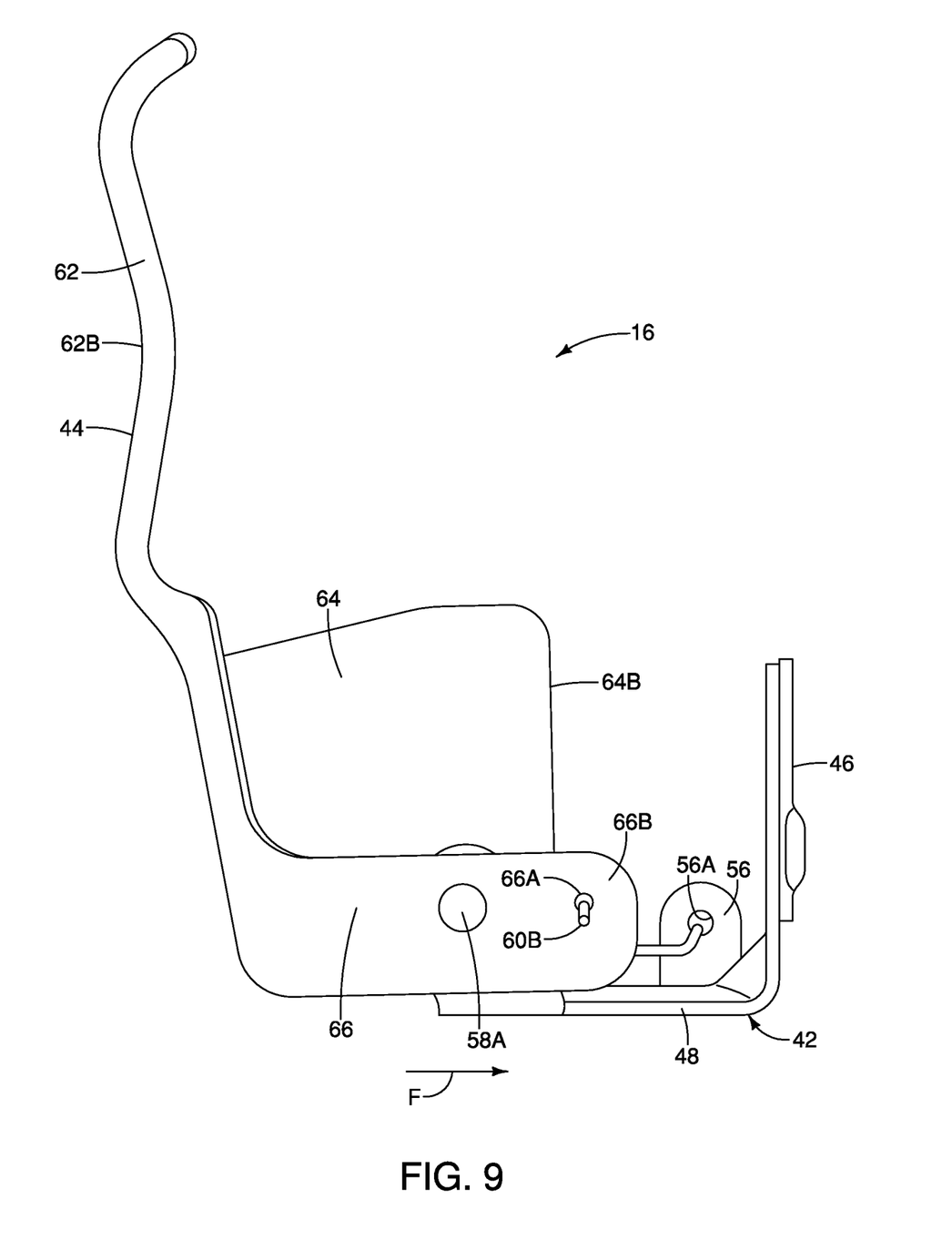
FIG. 9 is a side elevational view of the hood release lever cover assembly of FIG. 7.

The first and second arms 64 and 66 extend in a forward direction F of the vehicle 10, as shown in FIGS. 7-9. The second arm 66 extends further forward than the first arm 64, as shown in FIGS. 8 and 9. In other words a forward end 66B of the second arm 66 is closer to the mounting body 46 than a forward end 64B of the first arm 64. A height of the first arm 64 is larger than a height of the second arm 66, as shown in FIG. 9. The larger height of the first arm 64 increases the surface area of the first arm such that the increased surface area is a blocking portion to prevent access to the hood release lever 28 when the hood release lever cover 44 is in the first position (FIG. 3). The second arm 66 is disposed proximal the side wall 26C of the recessed portion 26 such that the side wall 26C of the recessed portion prevents accessing the hood release lever 28 from the inboard side of the hood release lever cover assembly 16 when the hood release lever cover 44 is in the first position. The first arm 64 is disposed in a vehicle outboard direction DO (FIG. 1) relative to the second arm 66, and the second arm 66 is disposed in a vehicle inboard direction DI (FIG. 1) relative to the first arm 64. As shown in FIG. 9, the shape of the first arm 64 is different from a shape of the second arm 66.

The pin 30 extends between the side walls 26B and 26C of the recessed portion 26, as shown in FIG. 3. The hood release lever 28 and the fuel tank door release lever 36 are movably connected to the pin 30 to facilitate moving each of the hood release lever 28 and the fuel tank door release lever 36 between the first and second positions. As shown in FIG.

4, the hood release lever 28 and the fuel tank door release lever 36 are disposed adjacent one another on the pin 30, with a gap therebetween to facilitate independent movement of each of the hood release lever 28 and the fuel tank door release lever 36. The hood release lever 28 is disposed in a vehicle inboard direction DI (FIG. 1) relative to the fuel tank door release lever 36. At least one spring member 32 is disposed on the pin 30 to bias each of the hood release lever 28 and the fuel tank door release lever 36 to the first position, as shown in FIG. 4.

The hood release lever cover assembly 16 is disposed in the recessed portion 26 of the instrument panel 22 of the vehicle body structure 12, as shown in FIGS. 1-6. The mounting body 46 of the bracket of the bracket assembly 42 is connected to the rear wall 26D of the recessed portion 26. The at least one fastener opening 50 of the mounting body receives a fastener to secure the hood release lever cover assembly 16 to the recessed portion 26. When the hood release lever cover assembly 16 is connected to the recessed portion 26, the hood release lever cover 44 is disposed in a vehicle rearward direction R (FIG. 1) relative to the hood release lever 28, as shown in FIG. 3, such that the hood release lever cover 44 substantially covers the hood release lever 28 when both the hood release lever cover 44 and the hood release lever 28 are in the first positions. By covering the hood release lever 28, the hood release lever cover 44 substantially prevents accidental movement of the hood release lever 28.

The pin 58 passes through the aligned openings 66A and 54A in the second arm 66 and the second mounting tab 54, respectively, and through the aligned openings 52A and 64A in the first mounting tab 52 and the first arm 64, respectively. A head 58A of the pin 58 is larger than the opening 64A in the first arm 64 to prevent movement of the pin toward the second arm 66. A nut 68 is disposed on the second end 58B of the pin 58 to prevent movement of the pin 58 toward the first arm 64. Alternatively, both ends of the pin 58 can be swaged to secure the pin to the bracket assembly 42.

The portion of the spring member 60 disposed on the pin 58 is disposed between the first and second mounting tabs 52 and 54, as shown in FIG. 8. The first end 60A of the spring member 60 is received by the opening 56A in the third mounting tab 56, and the second end 60B of the spring member 60 is received by the opening 66A in the second arm 66. The spring member 60 biases the hood release lever cover 44 to the first position, as shown in FIG. 3.

The hood release lever cover 44 is pivotally connected to the pin 58, as shown in FIGS. 6-9. The hood release lever 28 is pivotally connected to the pin 30, as shown in FIG. 3. The pin 58 is substantially parallel to the pin 30, as shown in FIGS. 3-6. The pin 58 on which the hood release lever cover 44 is pivotally disposed in disposed lower than the pin 30 on which the hood release lever 28 is pivotally disposed.

To open the hood 20 of the vehicle 10, the hood release lever cover 44 is moved from the first position, as shown in FIG. 3, to the second position, as shown in FIG. 4. The cutout portion 62A in the main body portion 62 of the hood release lever cover 44 facilitates moving the hood release lever cover 44 to the second position and holding the hood release lever cover 44 in the second position. The hood release lever cover 44 pivots in the clockwise direction when moving from the first position to the second position. The hood release lever 28 can then be accessed and moved to the second position, as shown in FIGS. 5 and 6. When the hood release lever 28 is moved to the second position, the hood 20 is moved to the released position shown in dashed lines in FIG. 1. The hood release lever cover 44 is maintained in the second position when moving the hood release lever 28 from the first position to the second position, as shown in FIGS. 5 and 6. The hood release lever 28 pivots in the counterclockwise direction when moving from the first position to the second position. As shown in FIGS. 3-6, the hood release lever cover 44 and the hood release lever 28 pivot in opposite directions, although the hood release lever cover 44 and the hood release lever 28 can be configured to pivot in the same direction. When the hood 20 is released, the hood release lever 28 is released and the spring member 32 returns the hood release lever 28 to the first position. The hood release lever cover 44 can then be released, and the spring member 60 returns the hood release lever cover 44 to the first position.

The second arm 64 includes a blocking portion to prevent accessing the hood release lever 28 from the outboard side of the hood release lever cover 44 when the hood release lever cover 44 is in the first position, as shown in FIG. 3. The side wall 26C prevents accessing the hood release lever 28 from the inboard side of the hood release lever cover 44 when the hood release lever cover 44 is in the first position. Operation of both the hood release lever cover 44 and the hood release lever 28 is a two-step process, thereby further substantially preventing accidental operation of the hood release lever 28. In the first step, the hood release lever cover 44 is moved such that the hood release lever 28 can be accessed. In the second step, the hood release lever 28 is moved to release the hood 20. The two-step process likely requires a separate hand for each step, thereby substantially preventing accidental operation of the hood release lever 28.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion." "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hood release lever cover assembly. Accordingly, these terms, as utilized to describe the present invention should be interpreted relative to a vehicle equipped with the hood release lever cover assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hood release lever cover assembly for a vehicle, the hood release lever cover assembly comprising:
    a bracket assembly configured to be connected to a vehicle body structure of the vehicle;
    a hood release lever cover pivotally connected to the bracket assembly, the hood release lever cover being pivotable between a first position, preventing movement of a hood release lever of the vehicle, and a second position, allowing movement of the hood release lever, the hood release lever cover being configured to overlie a majority of the hood release lever when the hood release lever cover is in the first position and when viewed in a direction facing a front surface of the hood release lever cover and perpendicular to a pivot axis of the hood release lever cover; and
    a pin rigidly connected to a mounting arm of the bracket assembly, the hood release lever cover being pivotally connected to the pin,
    the hood release lever cover including a main body portion, and first and second arms extending outwardly from the main body portion that are pivotally connected to the pin, a first distance from a first opening in the first arm to an uppermost surface of the first arm being longer than a second distance from a second opening in the second arm to an uppermost surface of the second arm, the first arm preventing access to the hood release lever in a direction substantially parallel to an axial direction of the pin when the hood release lever cover is in the first position, the first and second openings receiving the pin.

2. The hood release lever cover assembly according to claim 1, wherein
    a spring member is disposed on the pin, the spring member having a first end connected to the bracket assembly and a second end connected to the hood release lever cover.

3. The hood release lever cover assembly according to claim 2, wherein
    the spring member biases the hood release cover to the first position.

4. The hood release lever cover assembly according to claim 1, wherein
    the first arm is disposed in a vehicle outboard direction relative to the second arm, the first arm including a blocking portion to prevent access to the hood release lever in the direction substantially parallel to the axial direction of the pin when the hood release lever cover is in the first position.

5. The hood release lever cover assembly according to claim 1, wherein
    the main body portion includes a cutout portion to facilitate pivoting of the hood release lever cover.

6. The hood release lever cover assembly according to claim 1, wherein
    the bracket assembly includes at least one fastener opening configured to receive at least one fastener to secure the bracket assembly to the vehicle body structure.

7. The hood release lever cover assembly according to claim 1, wherein
    a shape of the first arm is a different shape from a shape of the second arm.

8. A hood release lever cover assembly for a vehicle, the hood release lever cover assembly comprising:
    a hood release lever pivotally connected to a vehicle body structure, the hood release lever being pivotable between a first position and a second position, a hood of the vehicle being released when the hood release lever is pivoted to the second position;
    a hood release lever cover pivotally connected to vehicle body structure, the hood release lever cover being pivotable between a first position, preventing movement of the hood release lever of the vehicle, and a second position, allowing pivoting of the hood release lever, a front surface of the hood release lever cover being disposed in front of a front surface of the hood release lever when the hood release lever is in the first position and the hood release lever cover is in the first position when viewed in a direction facing the front surface of the hood release lever cover and perpendicular to a pivot axis of the hood release lever cover; and
    a first pin connected to the vehicle body structure, the hood release lever cover pivotally receiving the first pin,
    the hood release lever cover including a main body portion, and first and second arms extending outwardly from the main body portion that are pivotally connected to the first pin, a first distance from a first opening in the first arm to an uppermost surface of the first arm being longer than a second distance from a second opening in the second arm to an uppermost surface of the second arm, the first arm preventing access to the hood release lever in a direction substantially parallel to an axial direction of the first pin when the hood release lever cover is in the first position, the first and second openings receiving the first pin.

9. The hood release lever cover assembly according to claim 8, wherein
    the hood release lever is pivotally received by a second pin connected to the vehicle body structure, the first pin being substantially parallel to the second pin.

10. The hood release lever cover assembly according to claim 8, wherein
    the hood release lever cover pivots in a first direction and the hood release lever pivots in a second direction, the second direction being opposite the first direction.

11. The hood release lever cover assembly according to claim 9, wherein
    the first pin is disposed lower than the second pin.

12. The hood release lever cover assembly according to claim 9, wherein
    a bracket assembly is connected to the vehicle body structure, the first pin being connected between first and second mounting tabs of the bracket assembly.

13. The hood release lever cover assembly according to claim 12, wherein
    a spring member is disposed on the first pin, the spring member having a first end connected to the bracket assembly and a second end connected to the hood release lever cover.

14. The hood release lever cover assembly according to claim 13, wherein
the spring member biases the hood release lever cover to the first position.

15. The hood release lever cover assembly according to claim 9, wherein
the hood release lever cover includes a main body portion, and first and second arms extending outwardly from the main body portion that are pivotally connected to the first pin.

16. The hood release lever cover assembly according to claim 15, wherein
the first arm is disposed in a vehicle outboard direction relative to the second arm, the first arm including a blocking portion to prevent access to the hood release lever in the direction substantially parallel to the axial direction of the first pin when the hood release lever cover is in the first position.

17. The hood release lever cover assembly according to claim 15, wherein
the main body portion includes a cutout portion to facilitate pivoting of the hood release lever cover.

* * * * *